(12) United States Patent
Gallet et al.

(10) Patent No.: US 8,622,699 B2
(45) Date of Patent: Jan. 7, 2014

(54) DEVICE ADAPTED TO BE FITTED WITH PROPELLER BLADES

(75) Inventors: François Gallet, Paris (FR); Patrick Morel, Chartrettes (FR); Wouter Balk, Melun (FR)

(73) Assignee: SNECMA, Paris (FR)

( * ) Notice: Subject to any disclaimer, the term of this patent is extended or adjusted under 35 U.S.C. 154(b) by 526 days.

(21) Appl. No.: 12/904,852

(22) Filed: Oct. 14, 2010

(65) Prior Publication Data
US 2011/0176924 A1   Jul. 21, 2011

(30) Foreign Application Priority Data
Oct. 15, 2009 (FR) ...................................... 09 57249

(51) Int. Cl.
   *F01D 7/00* (2006.01)
(52) U.S. Cl.
   USPC .............. 416/2; 416/61; 416/204 R; 416/207; 416/219 R; 416/221
(58) Field of Classification Search
   USPC ................. 416/2, 61, 204 R, 207, 219 R, 221
   See application file for complete search history.

(56) References Cited

U.S. PATENT DOCUMENTS

| | | | | | |
|---|---|---|---|---|---|
| 2,541,098 | A | * | 2/1951 | Redding | 416/193 R |
| 4,334,827 | A | * | 6/1982 | Bouiller et al. | 416/220 R |
| 4,488,399 | A | * | 12/1984 | Robey et al. | 416/94 |
| 4,732,538 | A | * | 3/1988 | Wollenweber et al. | 416/94 |
| 4,738,590 | A | * | 4/1988 | Butler | 416/129 |
| 5,112,191 | A | * | 5/1992 | Strock et al. | 416/129 |
| 5,152,668 | A | * | 10/1992 | Bulman et al. | 416/129 |

* cited by examiner

*Primary Examiner* — Igor Kershteyn
(74) *Attorney, Agent, or Firm* — Pillsbury Winthrop Shaw Pittman LLP

(57) ABSTRACT

A device adapted to be fitted with propeller blades includes a first retention ring including over a periphery thereof a plurality of radial bores; and a second retention ring including over a periphery thereof a plurality of radial bores, the first and second retention rings being mounted one on top of the other in the radial direction, each bore in the first retention ring being positioned opposite a bore in the second retention ring, a bore in the first retention ring arranged opposite a bore in the second retention ring forming a bore pair adapted to receive a foot of a blade.

17 Claims, 1 Drawing Sheet

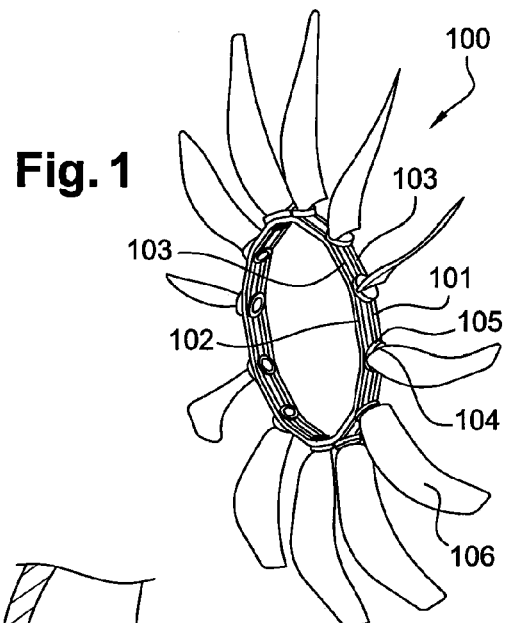
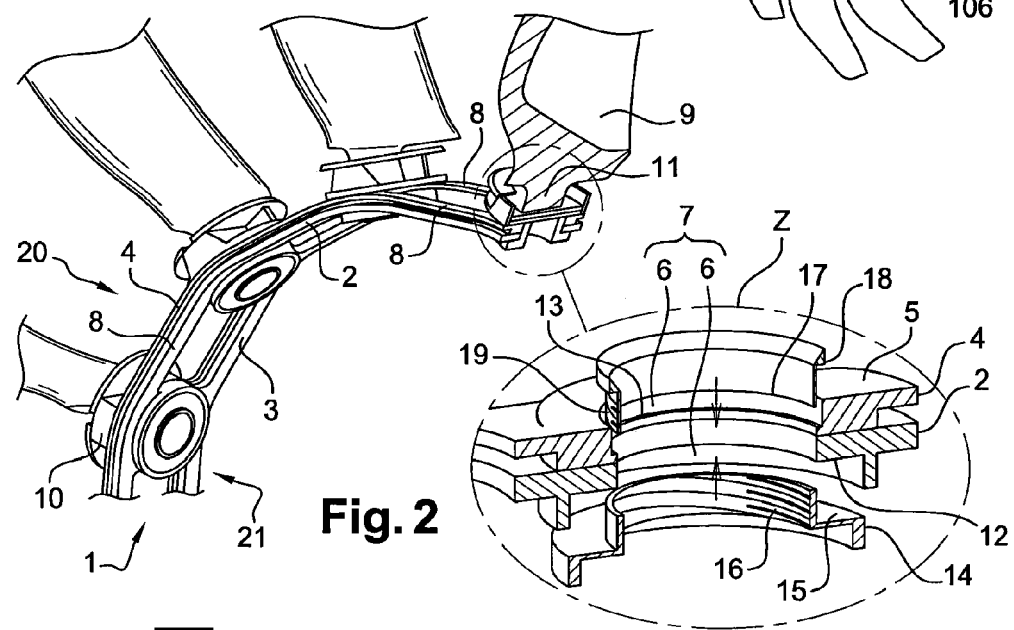
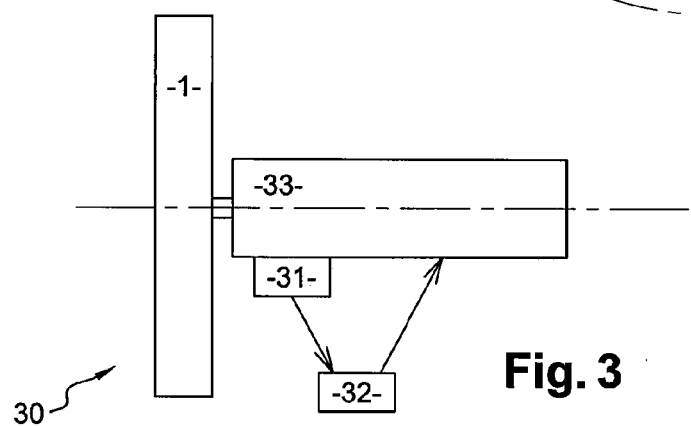

DEVICE ADAPTED TO BE FITTED WITH PROPELLER BLADES

CROSS-REFERENCE TO RELATED APPLICATIONS

This application is based upon and claims the benefit of priority from French Patent Application No. 09/57249, filed Oct. 15, 2009, the entire content of which is incorporated herein by reference.

The invention relates to a device adapted to be fitted with propeller blades. More specifically, the invention relates to a device adapted to be fitted with large propeller blades and to withstand all the forces to which these blades are subjected, such as centrifugal or aerodynamic forces. For example devices of this type are used to equip aeroplanes.

As is known, current devices adapted to be fitted with propeller blades are generally formed by a ring (typically made of titanium or a composite material) called a retention ring. Devices of this type are fixed to the rotating driving shafts. The ring constitutes a disc of relatively substantial mass able to withstand the centrifugal forces applied to it during rotation of the driving shaft. A ring of this type 100 is shown in FIG. 1. The ring 100 is a polygonal ring (i.e. the periphery of the ring 100 is polygonal in shape) formed of two polygonal structures 101 and 102 having identical dimensions, arranged side by side and distanced from one another. Each polygonal structure 101 and 102 is formed by a plurality of arms 103 or ligaments. The ring 100 comprises a plurality of bores 104 distributed uniformly over its periphery, each bore 104 being located between two parallel consecutive arms 103. These bores 104 are able to receive the bearings 105 for the feet of the blades 106.

Each bearing 105 for the foot of a blade 106 inserted into a bore 104 is consequently connected to a neighbouring bearing 105 by two arms 103. The use of two parallel polygonal structures distanced from one another instead of a full polygonal ring is advantageous in that it makes it possible to reduce the mass of the assembly formed by the ring and propeller blades 106.

Devices of this type are, however, susceptible to some drawbacks.

In fact it should be noted that the arms forming the ring are subjected to substantial centrifugal forces. In this instance the arms operate via tension. The formation of a crack caused by these tensile forces may cause an arm to break and therefore the ring to open. A solution therefore consists in oversizing the ring, thus leading to an increase in the mass of the assembly.

More specifically, the object of the invention is therefore to overcome the aforementioned drawbacks of these devices. In this regard the invention aims to propose a device adapted to be fitted with propeller blades making it possible to ensure optimal safety without oversizing the device.

To this end, the invention relates to a device adapted to be fitted with propeller blades comprising a first retention ring comprising over its periphery a plurality of radial bores, said device comprising a second retention ring comprising over its periphery a plurality of radial bores, said first and second retention rings being mounted one on top of the other in the radial direction, each bore in said first retention ring being positioned opposite a bore in said second retention ring, a bore in said first retention ring arranged opposite a bore in said second retention ring forming a bore pair able to receive a foot of a blade.

As a result of the invention, even if one of the rings fails (typically due to the breaking of this ring), the presence of a second, safety-redundant ring makes it possible to ensure, at least temporarily, that any forces are absorbed and the device functions. In other words, the device according to the invention proposes a secure design in which the force paths are redundant. If one of the paths of one of the rings fails, the paths of the unfailed ring therefore make it possible to absorb the forces.

In addition to the main features that have just been described in the paragraph above, the device according to the invention may have one or more of the additional features below, taken individually or in any technically feasible combination:

in accordance with a particularly advantageous embodiment of the invention, the materials of said first and second rings are able to pass from a resilient state to a plastic state, said device having two modes of operation:
  a normal mode of operation, during which said first and second rings are intact and said materials are in the resilient state;
  a damaged mode of operation, during which one of said first or second rings is damaged, the material of the undamaged ring being mechanically overloaded, the mechanical overload causing said material of the undamaged ring to pass into the plastic state;
said first and second rings are polygonal in shape, each ring being formed of two sets of arms arranged side by side, said two sets being distanced from one another and each bore being connected to a neighbouring bore in the same ring by two arms;
said material of said first and/or second rings is metal;
said material of said first and/or second rings is titanium;
said material of said first and/or second rings is a composite material;
said device comprises a plurality of lower collars and a plurality of upper collars, each lower collar being able to be assembled together with an upper collar on either side of a bore pair in such a way that said first and second rings are clasped together;
said upper and lower collars are threaded one on the other.

The invention also relates to a system comprising a device according to the invention, the materials of said first and second rings being able to pass from a resilient state to a plastic state, said device having two modes of operation:
  a normal mode of operation, during which said first and second rings are intact and said materials are in the resilient state;
  a damaged mode of operation, during which one of said first or second rings is damaged, the material of the undamaged ring being mechanically overloaded, the mechanical overload causing said material of the undamaged ring to pass into the plastic state;
said system also comprising:
  detection means adapted for detecting a signal representing a change in the state of said material of at least one of said first or second rings;
  engine stop means able to switch off the engine rotating said device, said detection means being able to communicate with said engine stop means in such a way that when said detection means detect a signal representing a change in state, said engine stop means stop said engine rotating said device.

Said signal is advantageously a vibratory signal generated by the vibrations of said device operating in the damaged state.

Other features and advantages of the invention will emerge clearly from the description given hereinafter by way of indication and in no way limiting, and given with reference to the accompanying drawings, in which:

FIG. 1 is a schematic view of an example of the device according to the prior art;

FIG. 2 is a schematic, partial view of a device according to the invention and also shows an exploded, enlarged view Z of part of this partial view;

FIG. 3 shows an example of the system according to the invention.

For the sake of clarity, only those components that are useful for understanding the invention have been shown, more specifically schematically with no respect for scale. Furthermore, like components illustrated in different figures are denoted by like reference numerals.

FIG. 1 has already been described above with reference to the prior art.

FIG. 2 is a schematic, partial view of a device 1 according to the invention adapted to be fitted with propeller blades 9. This device is called device 1 in the rest of the description. In particular, the device 1 differs from the device 100 described above in that it has two rings, called retention rings, of substantially similar construction. The device 1 is adapted to be rotated at high speed via a driving shaft, for example on a turboprop engine of an aeroplane. FIG. 2 shows an exploded and enlarged view Z of part of this partial view, making it possible to illustrate the assembly of the different components comprised by the device 1 according to the invention.

The device 1 comprises, in particular:
 a first ring 2, called a lower retention ring, (the inner face 3 of the first ring 2 is referenced in order to illustrate the assembly of the different components of the device 1);
 a second ring 4, called an upper retention ring, (the outer face 5 of the second ring 4 is referenced in order to illustrate the assembly of the different components of the device 1);
 a plurality of bores 6;
 a plurality of bearings 10 for the feet 11 of the blades 9.

The first and second rings 2 and 4 are formed of a polygonal structure (i.e. the periphery of the rings 2 and 4 is polygonal in shape).

The first and second rings 2 and 4 carry the bores 6, distributed uniformly over the periphery of said rings. Said bores are able to receive the bearings 10 for the feet 11 of the blades 9.

It should be noted that each ring 2, 4 comprises two polygonal structures 20 and 21 having identical dimensions, arranged side by side and distanced from one another. Each polygonal structure 20 and 21 is formed by a plurality of arms 8 or ligaments.

Each bore 6 is thus connected to a neighbouring bore 6 in the same ring 2, 4 by two arms 8. In particular, this specific detail makes it possible to lighten the entire mass of the device 1 since the first and second rings 2 and 4 are actually pierced between each bore 6.

The second ring 4 is mounted on the first ring 2 in the radial direction. Each bore 6 in the first ring 2 is positioned opposite a bore 6 in the second ring 4 in such a way that bore pairs 7 are formed. In other words, a bore pair 7 is formed by a bore 6 in the first ring 2 and by a bore 6 in the second ring 4.

Furthermore, each bore pair 7 is able to receive a bearing 10 for the foot 11 of a blade 9. Each bearing 10 for the foot 11 of a blade 9 is formed by a lower collar 14 and an upper collar 17.

Each lower collar 14 is assembled together with an upper collar 17 on either side of a bore pair 7 in such a way that the first and second rings 2 and 4 are clasped together.

In the example illustrated in FIG. 2:
 the lower collar 14 comprises a shoulder 15 and a thread 16;
 the upper collar 14 comprises a shoulder 18 and a thread 19.

As illustrated in the enlarged view Z, the lower collar 14 is inserted, via the inner face 3 of the first ring 2, inside the bore 6 formed in the first ring 2, and the upper collar 17 is inserted, via the outer face 5 of the second ring 4, inside the bore 6 formed in the second ring 4.

The upper collar 17 is then screwed by the thread 19 in the lower collar 14 comprising the thread 16. The lower and upper collars 14 and 17 are screwed until the shoulder 18 of the upper collar 17 contacts the shoulder 13 of the second ring 4 and until the shoulder 15 of the lower collar 14 contacts the shoulder 12 of the first ring 2. In other words, each pair of lower and upper collars 14, 17 plays a bolting role making it possible to keep the first and second rings 2 and 4 connected.

A collar pair (lower collar 14 and upper collar 17) is positioned inside each bore pair 7 comprised by the device 1 in order to precisely position and connect the first and second rings 2 and 4.

Generally, when the device 1 is mounted on a shaft (not shown), such as the shaft of a rapid pusher engine, the device 1 according to the invention is subjected to centrifugal forces generated by inertia. For example, this inertia leads to tensile forces on the arms 8. Forces of this type may eventually form a crack, causing an arm 8 to break and consequently causing one of the rings 2 or 4 comprising the broken arm 8 to open.

If one of the arms 8 of the first or second rings 2 or 4 breaks, the portion of the remaining material is sufficient to hold the device 1 on the driving shaft, the rings 2 and 4 being dimensioned in such a way that the mechanical overload of the remaining arms is compatible with operation in the plastic state. It is not therefore necessary to oversize the rings 2 and 4. Advantageously, the total section of the first and second rings 2 and 4 is preferably less than or equal to the section of a standard ring, i.e. a ring implemented by the devices of the prior art.

The material of the first and second rings 2 and 4 has two mechanical operating states: a resilient state and a plastic state. The rings 2 and 4 are preferably made of the same material, such as a metal, preferably titanium, or a composite material.

The rest of the description refers to:
 a normal mode of operation: a mode of operation of the device 1, during which the first and second rings 2 and 4 are intact (i.e. no broken arms 8) and are in the resilient state;
 a damaged mode of operation: a mode of operation of the device 1, during which any one of said first or second rings 2 or 4 is damaged (i.e. at least one arm 8 of one of the rings 2 or 4 is broken). If one of the rings 2 or 4 is damaged, the undamaged material of the arms 8 of the ring absorbs the mechanical overload by passing from a resilient state into a plastic state.

The total section of the arms 8 of the first and second rings 2 and 4 is dimensioned in such a way that the materials forming said arms are in a resilient state when the device 1 is in the normal operating mode.

In the scenario in which an arm 8 of the first ring 2 or of the second ring 3 breaks, the undamaged arms 8 of the other ring withstand a greater mechanical load. This increase in load generates a change in state for the material forming the undamaged ring: the material thus passes from a resilient state to a plastic state. The device 1 is thus imbalanced and enters into the damaged operating state. The damaged operation results in non-axisymmetric plastic deformation of the device 1 generating, during rotation thereof, an imbalance and therefore vibrations. It should be emphasised that the breaking of an arm 8 does not lead to the destruction of the device 1 and makes it possible to ensure, at least temporarily, operation of the device 1.

As illustrated in FIG. 3, the invention also relates to a system 30 comprising a device 1 according to the invention. The device 1 is rotated by a driving shaft 33.

The system 30 comprises:

the device 1;

detection means 31 adapted to detect a signal representing a change in the state of the material of at least one of the first or second rings 2 or 4;

engine stop means 32 able to stop the engine 33 and therefore rotation of the device 1.

The detection means 31 are formed, for example, by vibration sensors.

The detection means 31 are adapted to detect a signal representing a change in the state of the material of at least one of the first or second rings 2 or 4. Since damaged operation of the device 1 consists of non-axisymmetric plastic deformation of the device 1, said device is imbalanced, generating vibrations in rotation; the signal representing a change in the state of the material of one of the first or second rings 2 or 4 is, in this instance, a vibratory signal.

In accordance with implementation of this type, the detection means 31 are preferably arranged on the engine 33.

As soon as the detection means 31 detect vibrations of the engine 33 caused by vibrations of the device 1, they therefore inform the engine stop means 32 of this and said engine stop means therefore disconnect the engine 33 of the device 1.

The device 1 of the invention is generally of a design in accordance with which the force paths, formed by the arms 8 of the first and second rings 2 and 4, are redundant. As a result, in the scenario in which one path is faulty, for example because an arm 8 has broken, other paths (of the undamaged arms 8) will therefore absorb these forces that were initially absorbed by the arms 8. The forces exerted over the other paths are thus increased. This increase in force leads to the material of the other paths passing into a plastic state. Advantageously, this design makes it possible to avoid complete breaking of the device 1. The device 1 is therefore completely fail-safe.

The invention is described above by way of example; it is understood that the person skilled in the art will be able to form different variants of the device according to the invention, in particular with regard to the assembly means (lower and upper collars) of the first and second rings 2 and 4 without departing from the scope of the patent.

Similarly, although the invention has been described more specifically in the case of a ring having a polygonal periphery, it may be applied to any type of ring, including circular rings.

The invention claimed is:

1. A device adapted to be fitted with propeller blades, the device comprising:

a first retention ring comprising over a periphery thereof a plurality of radial bores;

a second retention ring comprising over a periphery thereof a plurality of radial bores, said first and second retention rings being mounted one on top of the other in the radial direction, each bore in said first retention ring being positioned opposite a bore in said second retention ring, a bore in said first retention ring arranged opposite a bore in said second retention ring forming a bore pair adapted to receive a foot of a blade, and a fastener securing the first retention ring and the second retention ring together, and securing the foot of the blade to the bore pair.

2. The device according to claim 1, wherein said first and second retention rings are made of materials adapted to pass from a resilient state to a plastic state, said device having two modes of operation:

a normal mode of operation, during which said first and second retention rings are intact and said materials are in the resilient state;

a damaged mode of operation, during which one of said first and second retention rings is damaged, the material of the undamaged ring being mechanically overloaded, the mechanical overload causing said material of the undamaged ring to pass into the plastic state.

3. The device according to claim 1, wherein a material of said first and/or second retention rings is metal.

4. The device according to claim 3, wherein said material of said first and/or second retention rings is titanium.

5. The device according to claim 1, wherein a material of said first and/or second retention rings is a composite material.

6. A system comprising the device according to claim 1, said first and second retention rings made of materials adapted to pass from a resilient state to a plastic state, said device having two modes of operation:

a normal mode of operation, during which said first and second retention rings are intact and said materials are in the resilient state;

a damaged mode of operation, during which one of said first and second retention rings is damaged, the material of the undamaged ring being mechanically overloaded, the mechanical overload causing said material of the undamaged ring to pass into the plastic state;

said system comprising:

detection means adapted for detecting a signal representing a change in the state of said material of at least one of said first and second retention rings;

engine stop means adapted to switch off the engine rotating said device, said detection means being able to communicate with said engine stop means in such a way that when said detection means detect a signal representing a change in state, said engine stop means stop said engine rotating said device.

7. The system according to claim 6, wherein said signal is a vibratory signal generated by vibrations of said device operating in the damaged state.

8. A system comprising the device according to claim 1, said first and second retention rings made of materials adapted to pass from a resilient state to a plastic state, said device having two modes of operation:

a normal mode of operation, during which said first and second retention rings are intact and said materials are in the resilient state;

a damaged mode of operation, during which one of said first and second retention rings is damaged, the material of the undamaged ring being mechanically overloaded, the mechanical overload causing said material of the undamaged ring to pass into the plastic state;

said system further comprising a detector adapted to detect a signal representing a change in the state of said material of at least one of said first and second retention rings.

9. An engine of an airplane comprising the device according to claim 1.

10. The device according to claim 1, wherein the fastener comprises a lower collar and an upper collar, the lower collar being adapted to be assembled together with the upper collar on either side of the bore pair such that said first and second retention rings are clasped together.

11. A device adapted to be fitted with propeller blades, the device comprising:

a first retention ring comprising over a periphery thereof a plurality of radial bores; and a second retention ring comprising over a periphery thereof a plurality of radial bores, said first and second retention rings being mounted one on top of the other in the radial direction, each bore in said first retention ring being positioned opposite a bore in said second retention ring, a bore in said first retention ring arranged opposite a bore in said second retention ring forming a bore pair adapted to receive a foot of a blade, wherein said first and second retention rings are polygonal in shape, each ring being formed of two sets of arms arranged side by side, said two sets of arms being distanced from one another and each bore being connected to a neighboring bore in the same ring by two arms.

12. A system comprising the device according to claim 11, said first and second retention rings made of materials adapted to pass from a resilient state to a plastic state, said device having two modes of operation:

a normal mode of operation, during which said first and second retention rings are intact and said materials are in the resilient state;

a damaged mode of operation, during which one of said first and second retention rings is damaged, the material of the undamaged ring being mechanically overloaded, the mechanical overload causing said material of the undamaged ring to pass into the plastic state;

said system further comprising a detector adapted to detect a signal representing a change in the state of said material of at least one of said first and second retention rings.

13. An engine of an airplane comprising the device according to claim 11.

14. A device adapted to be fitted with propeller blades, the device comprising:

a first retention ring comprising over a periphery thereof a plurality of radial bores;

a second retention ring comprising over a periphery thereof a plurality of radial bores, said first and second retention rings being mounted one on top of the other in the radial direction, each bore in said first retention ring being positioned opposite a bore in said second retention ring, a bore in said first retention ring arranged opposite a bore in said second retention ring forming a bore pair adapted to receive a foot of a blade; and a plurality of lower collars and a plurality of upper collars, each lower collar being adapted to be assembled together with an upper collar on either side of a bore pair such that said first and second retention rings are clasped together.

15. The device according to claim 14, wherein said upper and lower collars are threaded one on the other.

16. A system comprising the device according to claim 14, said first and second retention rings made of materials adapted to pass from a resilient state to a plastic state, said device having two modes of operation:

a normal mode of operation, during which said first and second retention rings are intact and said materials are in the resilient state;

a damaged mode of operation, during which one of said first and second retention rings is damaged, the material of the undamaged ring being mechanically overloaded, the mechanical overload causing said material of the undamaged ring to pass into the plastic state;

said system further comprising a detector adapted to detect a signal representing a change in the state of said material of at least one of said first and second retention rings.

17. An engine of an airplane comprising the device according to claim 14.

* * * * *